United States Patent [19]

Jinnai et al.

[11] Patent Number: 4,884,144
[45] Date of Patent: Nov. 28, 1989

[54] ELECTRONIC CAMERA

[75] Inventors: Shigeru Jinnai; Shinji Sakai, both of Kanagawa, Japan

[73] Assignee: Canon Kabushiki Kaisha, Tokyo, Japan

[21] Appl. No.: 338,364

[22] Filed: Apr. 12, 1989

Related U.S. Application Data

[63] Continuation of Ser. No. 51,667, May 18, 1987, abandoned.

[30] Foreign Application Priority Data

May 21, 1986 [JP] Japan .................................. 61-116375

[51] Int. Cl.⁴ ............................................ H04N 5/238
[52] U.S. Cl. ..................................... 358/228; 354/446
[58] Field of Search .......................... 358/228; 354/446

[56] References Cited

U.S. PATENT DOCUMENTS

| 4,427,996 | 1/1984 | Tamura | 358/228 |
| 4,584,610 | 4/1986 | Mizokami et al. | 358/228 |
| 4,638,365 | 1/1987 | Kato | 358/228 |

FOREIGN PATENT DOCUMENTS 0107684 6/1984 Japan .................................. 358/228

Primary Examiner—Russell E. Adams
Attorney, Agent, or Firm—Robin, Blecker, Daley & Driscoll

[57] ABSTRACT

An electronic camera having a setting circuit for setting values of the aperture, the shutter time and the gain of the image pickup system and a control circuit for causing the setting circuit to alter the preset value of the gain of the image pickup system in relation to the preset values of the aperture and the shutter time, wherein an exposure value suited to the nature of any given photographic situation can be derived.

16 Claims, 11 Drawing Sheets

ELECTRONIC CAMERA

This application is a continuation of application Ser. No. 051,667, filed May 18, 1987, now abandoned.

BACKGROUND OF THE INVENTION

1. Field of the Invention

This invention relates to an electronic camera having an automatic exposure mechanism.

2. Description of the Related Art

In the present state of art of electronic cameras, it is possible to impart even a capability of varying the gain of the image pickup system on the analogy of the variation of the film sensitivity in the silver halide film camera.

However, in such an electronic camera, for shooting an object of high speed, it is by a manual operation that the gain of the image pickup system must be increased to thereby prevent a blurred picture from being taken.

In another type of electronic camera which is unable to alter the gain of the image pickup system, shootings had to be made with slower shutter speeds than the desired one.

In contrast with this, when the CCD or like image pickup element was exposed for a long time, an appreciable loss of the image quality due to the unevenness of dark current was found.

SUMMARY OF THE INVENTION

It is therefore an object of the invention to provide an electronic camera with automatic means making it possible to adjust the gain of the image pickup system in accordance with sort of an object to be photographed (for example, whether to shoot sports photography, or still lifes of persons and others).

To achieve such an object, in an embodiment of the invention, use is made of means for setting values of the aperture, the shutter speed and the gain of the image pickup system and control means for causing the setting means to alter the value of the gain of the image pickup system in relation to the aforesaid preset value of the aperture or the shutter speed, thereby an exposure value suited to the given photographic situation can be obtained.

Even when a proper exposure can be derived from the combination of the preset values of the shutter speed and aperture, if the photographer wants to make a better picture than that which will be taken with this exposure, he may alter the gain of the image pickup system without suffering from camera-shakes or the like.

Other objects and features of the invention will become apparent from the following description and the accompanying drawings.

DETAILED DESCRIPTION OF THE PREFERRED EMBODIMENTS

Figure 1:
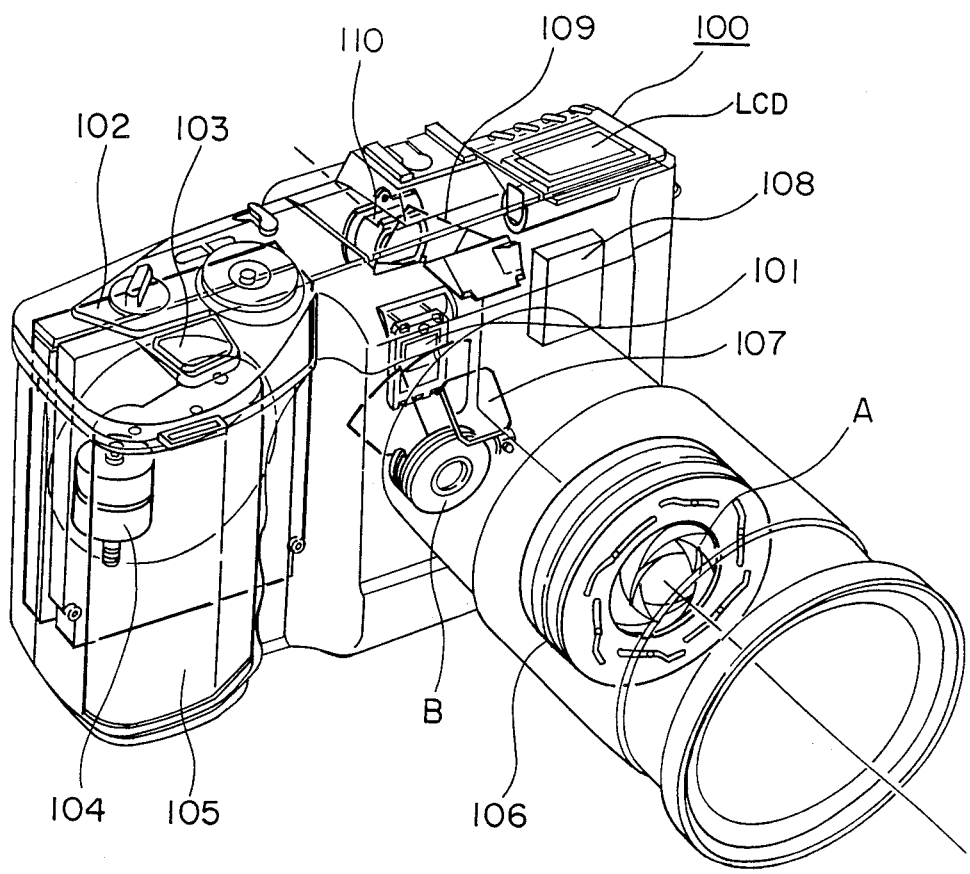
FIG. 1 is a perspective view of the entire structure of an electronic camera according to the invention.

In FIG. 1, the electronic camera employing the features of the invention is generally indicated at 100, including a solid state image pickup element or CCD 101, a disk drive unit 102, a magnetic sheet 103 (floppy) as the recording medium, an electric motor 104 for controlling the position of a recording head relative to the magnetic sheet 103, a main battery pack 105, a hollow-core stepping motor 106 for driving a diaphragm A, and a 45° mirror movable between a position in which light entering through the photographic lens is reflected to a roof-type prism 109 and therefrom directed to an eyepiece lens 110 and another position in which the path of the light to the image pickup element 101 is cleared. For note, B is a shutter positioned between this mirror 107 and the image pickup element 101; LCD is a liquid crystal shutter type display device; and 108 is a control unit.

Figure 2:
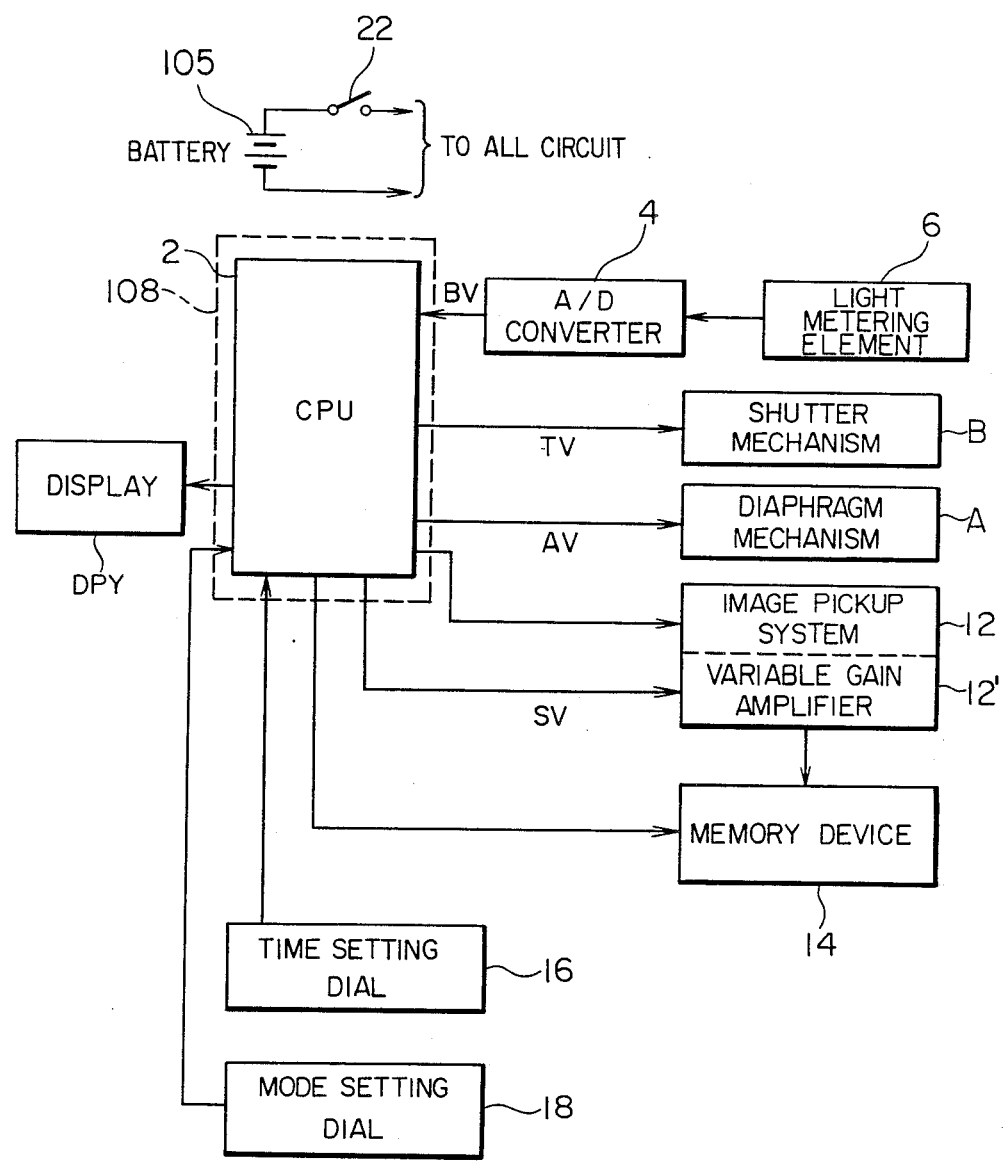
FIG. 2 is a block diagram of an embodiment of the invention applied to the electronic camera.

The block diagram shown in FIG. 2 represents a control circuit of the electronic camera to which the present invention is applied. In this figure, A CPU (Central Processing Unit) included in the above-described control unit 108 executes a program for control which will be described in greater detail in FIG. 3 and those that follow.

4 is an A/D converter; 6 is a light metering element; 12 is an image pickup system including an image pickup element 101 and an amplifier 12' for varying and adjusting the gain of the output of this element 101; 14 is a memory device provided with a disk drive unit 102 for memorizing still pictures.

16 is a time setting dial for a shutter mechanism; 18 is a mode setting dial for indicating any of the various modes (shown in FIG. 3) the camera has; DPY is a display device.

Here, a variable TV (Time Value) to be indicated from CPU 2 to the shutter mechanism B has a corresponding value to the shutter time, and there is formed the relationship: the shutter time $=2^{-TV}$. Therefore, it is found that, for example, when TV=0, 1 sec.;
when TV=3, $\frac{1}{8}$sec.; and
when TV=10, 1/1024 sec.

in shutter speed are indicated.

Similarly, another variable AV (Aperture Value) to be indicated from the CPU 2 to a diaphragm mechanism A has a corresponding value to the F-number, and there is formed the relationship:

$$F\text{-number} = (\sqrt{2})^{AV}$$

Therefore, it is found that, for example, when AV=0, F=1.0
when AV=1, F=1.4;
when AV=2, F=2; and
when AV=5, F=5.6 are indicated.

Hence, the exposure value EV is given by the expression: $EV=AV+TV$. It should be pointed out here that in the embodiment of the invention, the electronic camera is so constructed as to make variable the gain of the image pickup system. By taking into account still another variable SV (Speed Value) representing the gain of the image pickup system, $$EV=BV+SV=AV+TV$$

is set forth, where BV denotes the luminance value, and SV=0 represents the normal gain As the value of the SV increases, the gain of the image pickup system increases, (as will be described more fully later).

With such features of the invention, in a certain one of the exposure modes, when excess of the computed value of the shutter speed beyond a range for avoiding introduction of camera shake into the picture is detected, the gain of the image pickup system is caused to increase. After that, setting of renewed values of the shutter speed and aperture is carried out. For note, as the means for varying the gain, use may be made of a variable gain amplifier arranged in a signal path of the image pickup system as shown in FIG. 2 so that this gain is controlled. The sensitivity of the image pickup device itself may otherwise be made to vary.

Also, in the manual exposure and actual aperture automatic exposure modes, the SV value to be set is made proper depending on the TV value in order to take a good balance between the improvement of the image quality and the occurrence of a blurring of the picture.

Next, the operation of the embodiment of the invention is described in detail by reference to FIGS. 3 to 15.

Figure 3:
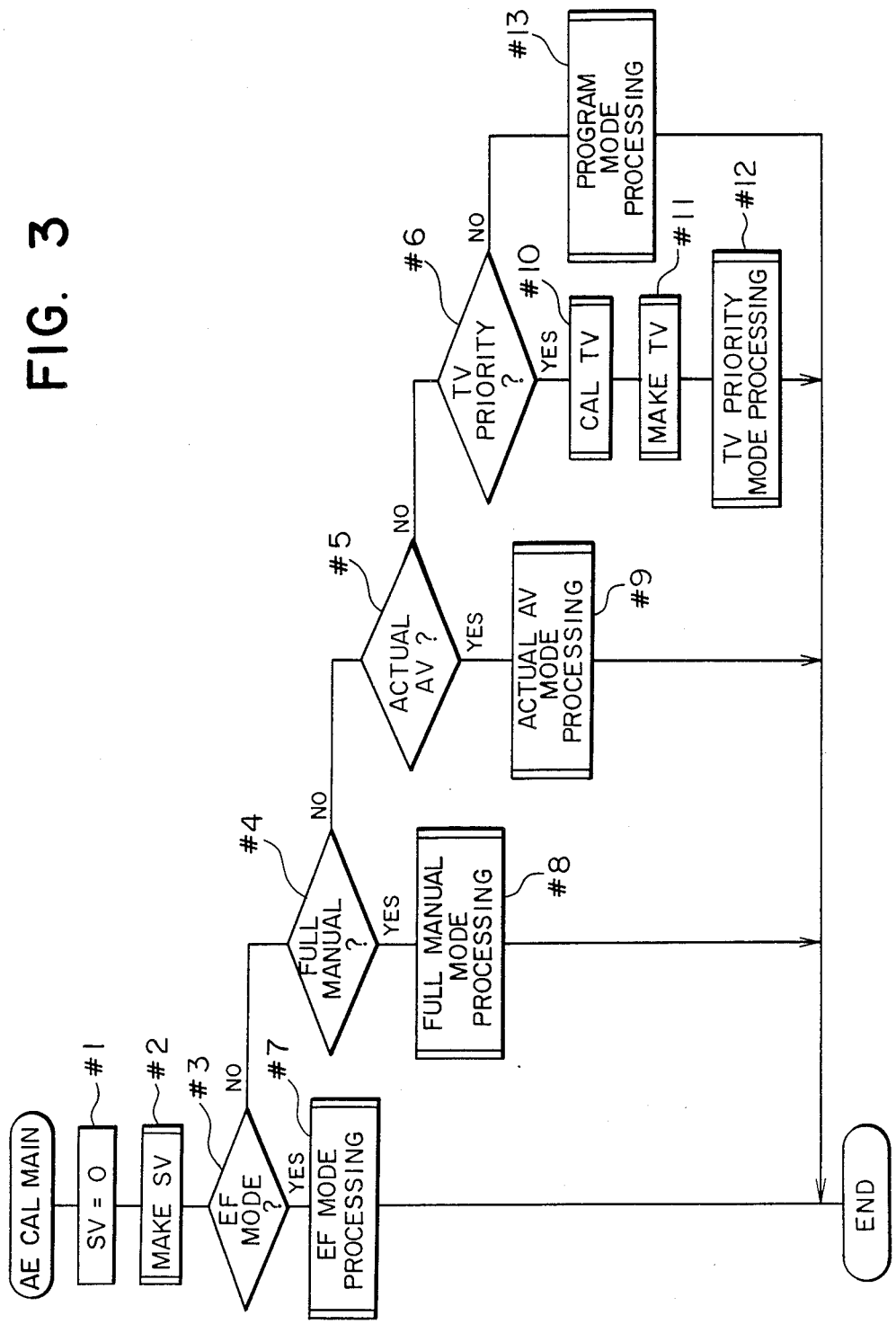
FIGS. 3–7, 8(A) and 8(B) and FIGS. 9–15 a flowchart for the operation of the camera of the invention.

FIG. 3 is a flowchart illustrating the main routine the CPU 2 should execute. In a step #1 shown in this figure, the initial value of the SV is taken at 0, or the gain at 1. In a step #2, a subroutine for setting the SV in a range of $0 \leq SV \leq 1.5$ (see FIG. 14) is executed.

Figure 14:
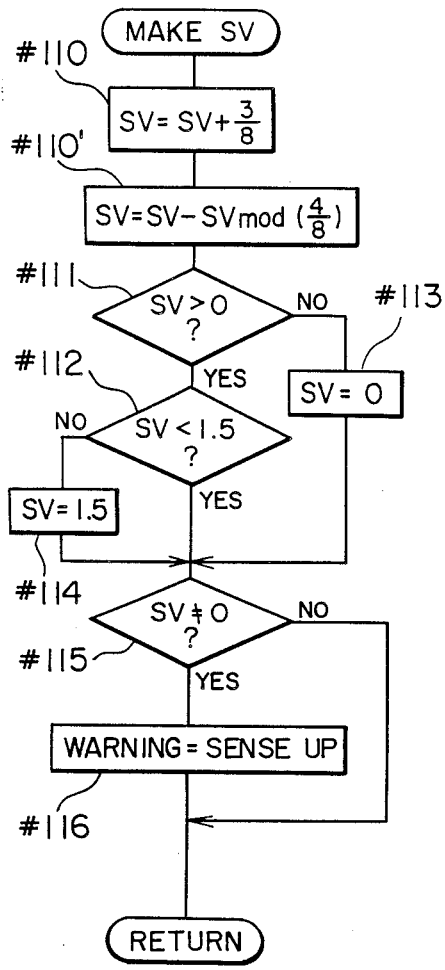

Next explanation is made about the MAKE SV routine of this step #2. In FIG. 14, in a step #110, $\frac{3}{8}$ is added to the value of the SV. In this case, suppose the previous value of the SV was $SV=(4n+m)/8$ where n and m both are integers), the addition gives $SV=(4n+3+m)/8$ in the step #110. In the next step #110′, subtraction: $SV-SVmod(4/8)$ is carried out, where $SVmod(4/8)$ represents the remainder of the division of SV by 4/8. Therefore, after the execution of the step #110′, SV becomes a multiple of 4/8, or $SV=-0.5, 0, +0.5, +1, +1.5$ and so on.

Next, whether or not $SV>0$ is tested in a step #111. If $SV \leq 0$, then turn up to $SV=0$ (step #113). Also, even if $SV>0$, whether or not $SV<1.5$ is tested (step #112). If $SV \geq 1.5$, then turn down to $SV=1.5$ in a step #114. Also, if $0<SV<1.5$, then advance to a step #115. Therefore, until the step #115, the setting of $0 \leq SV \leq 1.5$ is completed. Except for the case of $SV \neq 0$, after "sensitivity upping in progress" has been displayed by a display device (not shown) in a step #116, or when $SV=0$, without the display, a return to the main routine occurs. In this case, advances to a step #3 of FIG. 3.

In steps #3–#6, the five modes indicated by the mode setting dial 18 (see FIG. 2) are detected, and the procedure is allocated in correspondence to each mode. Then advance to the corresponding procedure of step #7–#10 or #13. It is to be noted here that the details of EF routine for operating an electro-flash mode shown in the step #7 will be described by reference to FIG. 4.

Another or FULL MANUAL routine for operating a full manual mode shown in the step #8 will be described in detail by reference to FIG. 5.

Another or ACTUAL AV routine for operating an actual AV mode shown in the step #9 will be described in detail by reference to FIG. 6.

Another or CAL TV routine for operating a shutter time calculating mode shown in the step #10 will be described in detail by reference to FIG. 10.

Another or MAKE TV routine for operating a shutter time setting mode shown in the step #11 will be described in detail by reference to FIG. 13.

Another or TV PRIORITY routine for operating a shutter time priority mode shown in the step #12 will be described in detail by reference to FIG. 7.

Another or PROGRAM routine for operating a program mode shown in the step #13 will be described in detail by reference to FIGS. 8(A) and 8(B).

At first, the EF routine is described with reference to the flowchart of FIG. 4. In a step #14, $6+\frac{3}{8}$ is set in TV. In the next step #15, the content of TV is changed so as to satisfy $3 \leq TV \leq 11$. In more detail, whether or not $TV \geq 3$ is tested in a step #106 of FIG. 13. If $TV<3$, then turn up to $TV=3$ (step #108). Even for $TV \geq 3$ if $TV \leq 11$ is determined not to be in a step #107, then turn down to $TV=11$ (step #109). If $3 \leq TV \leq 11$, then advance to a step #16 of FIG. 4 without further alteration.

In the step #16, 0 is set in SV. In the next #17, the content of SV is adjusted so as to satisfy $0 \leq SV \leq 1.5$.

In a step #18, AVEF (the AV value in EF mode) is read out. In the next step #19, whether or not this AV value is over a prescribed range is tested. If the result is that it lies beyond the range is determined, then advance to a step #20 to set a flag called "EF OVER RANGE". After that, an advance to a step #23 occurs.

If that AV value is determined in the step #19 to fall within the range, then advance to a step #21 to test whether this aperture value AVEF has been set manually (manual) or automatically (auto). If the result shows that the manual setting has been operated, then advance to a step #22 to set a flag called "EF MANUAL MODE" with presentation of its display. If the automatic setting has been operated, then advance to a step #23 without further alteration.

In the step #23, the AV is corrected by an equation: $AV=AVEF+SV-LOSS$ (where LOSS is the loss of light in passing through the lens). Then advance to a step #24.

In steps #24–#31, the AV is set so as to satisfy $AV0$ (the minimum mechanical limit of $AV) \leq AV \leq AVMAX$ (the maximum mechanical limit of AV). That is, if $AV<AV0$, $AV=AV0$ is made, and "too dark" is set in one of flags showing "WARNING" with presentation of its display (the steps #27–#28). Also, if $AV \geq AVMAX$, "too bright" is set in one of the other flags showing "WARNING" with presentation of its display (the step #30). The details of the MAKE AV routine for setting the AV shown in the step #31 are shown in FIG. 15.

Figure 15:
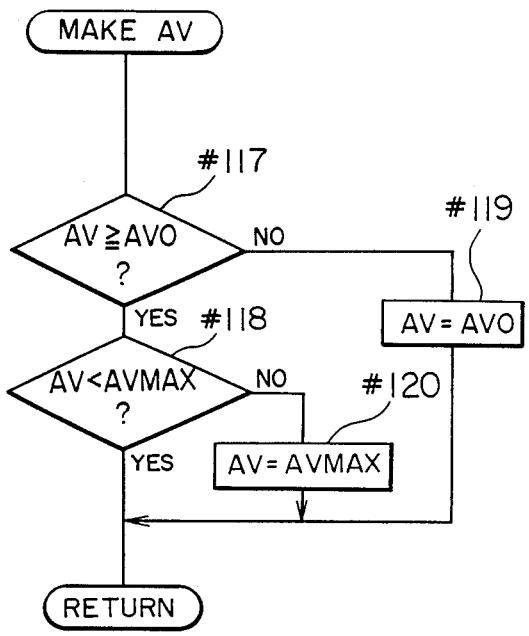

In FIG. 15, what is so-called "MAKE AV" is a subroutine for regulation to $AV0 \leq AV \leq AVMAX$. If, in a step #117, not $AV \geq AV0$, $AV=AV0$ is made in a step #119. Even for, in the step #117, $AV \geq AV0$, if in a step #118, not $AV<AVMAX$, $AV=AVMAX$ is made in a step #120. If $AV0 \leq AV<AVMAX$, then return to the main routine without further alteration.

Figure 4:
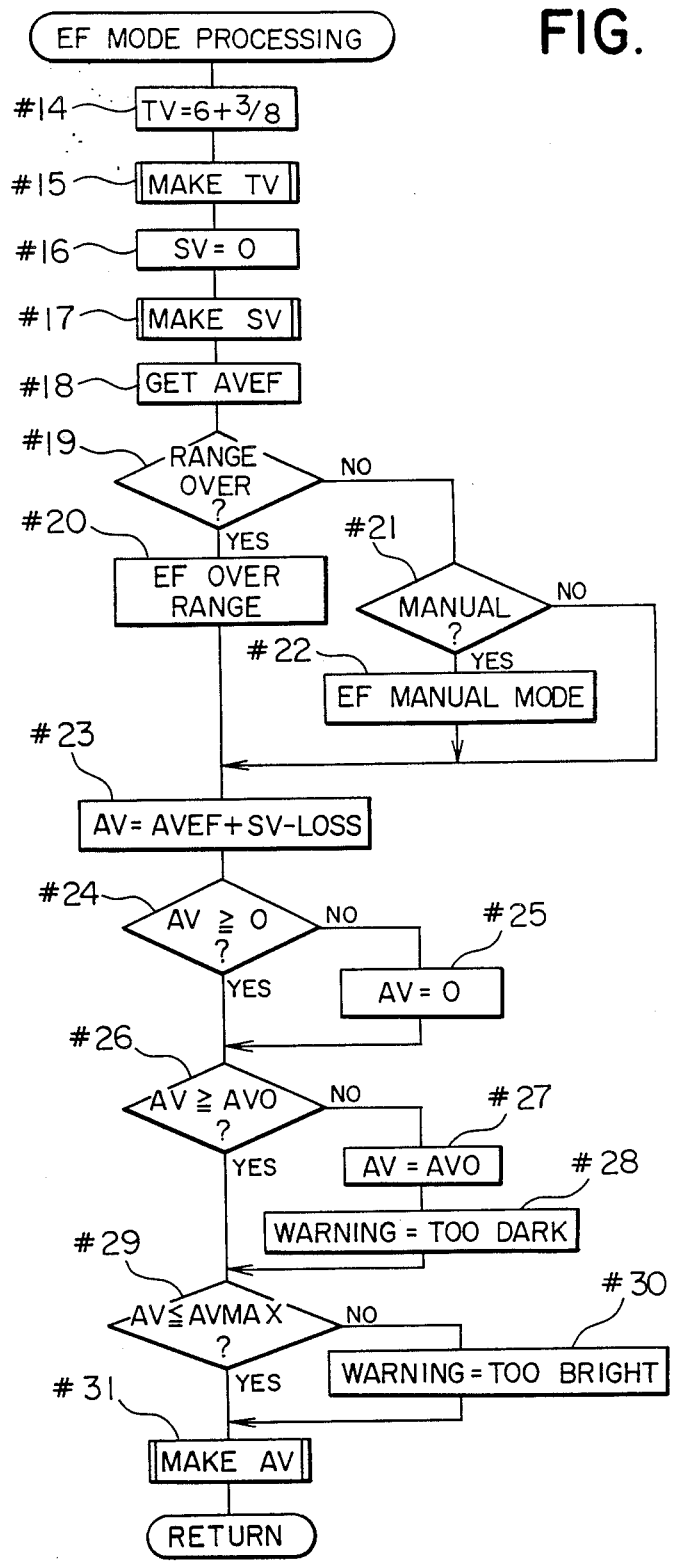

Since, here, it is next to the step #31 of FIG. 4, an advance to the end of FIG. 3 occurs.

Figure 5:
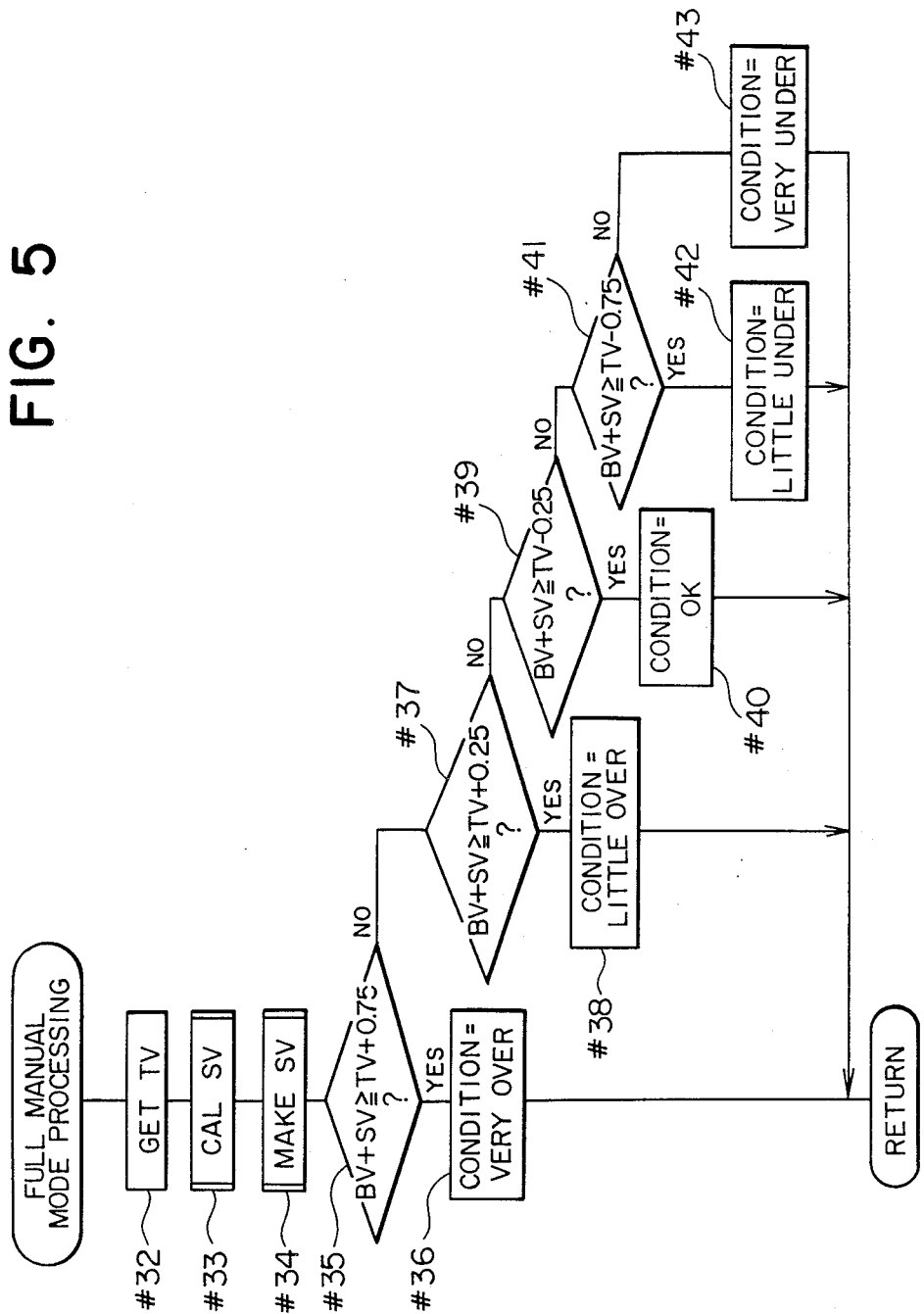

Next explanation is given to the routine for operating the full manual mode with reference to FIG. 5.

Figure 12:
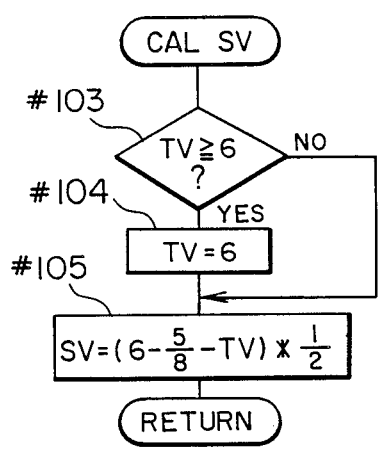

In a step #32, the manually set TV value is read in the CPU 2, and in a step #33, based on this TV, a value SV is computed by a "CAL SV" routine which is shown in FIG. 12.

In FIG. 12, in a step #103, whether or not $TV \geq 6$ is tested. If $TV<6$, then advance to a step #105. If $TV \geq 6$, then set $TV=6$ in a step #104 before the advance to the step #105.

In this step #105, $SV=(6-(\frac{3}{8})-TV)*\frac{1}{2}$ is computed to obtain SV.

That is, in case when the shutter time is shorter than 1/60 sec., TV=6 is taken for the computation of the step #105. Therefore, $SV=-(\frac{3}{8})*(\frac{1}{2})=$approx. 0. Thus, no increase in sensitivity is anticipated. For a longer shutter time than 1/60 sec., on the other hand, while the TV becomes one step smaller, the SV is caused to rise up by each unit of 4/8 instead.

After having advanced to the next step #34, it is, therefore, resulted from the execution of the "MAKE SV" routine that SV=0.5 for TV=5; SV=1 for TV=4; SV=1.5 for TV=3 and so on.

In steps #35–#43, each flag representing "condition" is set according to the scheme shown in a table 1 below, and its display is presented. After that, a return to the main routine (see FIG. 3) occurs.

TABLE 1

| | "Condition" |
|---|---|
| BV + SV ≧ TV + 0.75 | very over |
| BV + SV ≧ TV + 0.25 | little over |
| BV + SV ≧ TV − 0.25 | OK |
| BV + SV ≧ TV − 0.75 | little under |
| BV + SV < TV − 0.75 | very under | where BV is the luminance value obtained on the basis of the output of the light metering element 6 through the A/D converter 4 shown in FIG. 2.

It is to be noted here that since $BV+SV=EV$ (Exposure Value), the condition shown in the Table 1 represents whether or not the set TV is appropriate to the exposure value.

Figure 6:
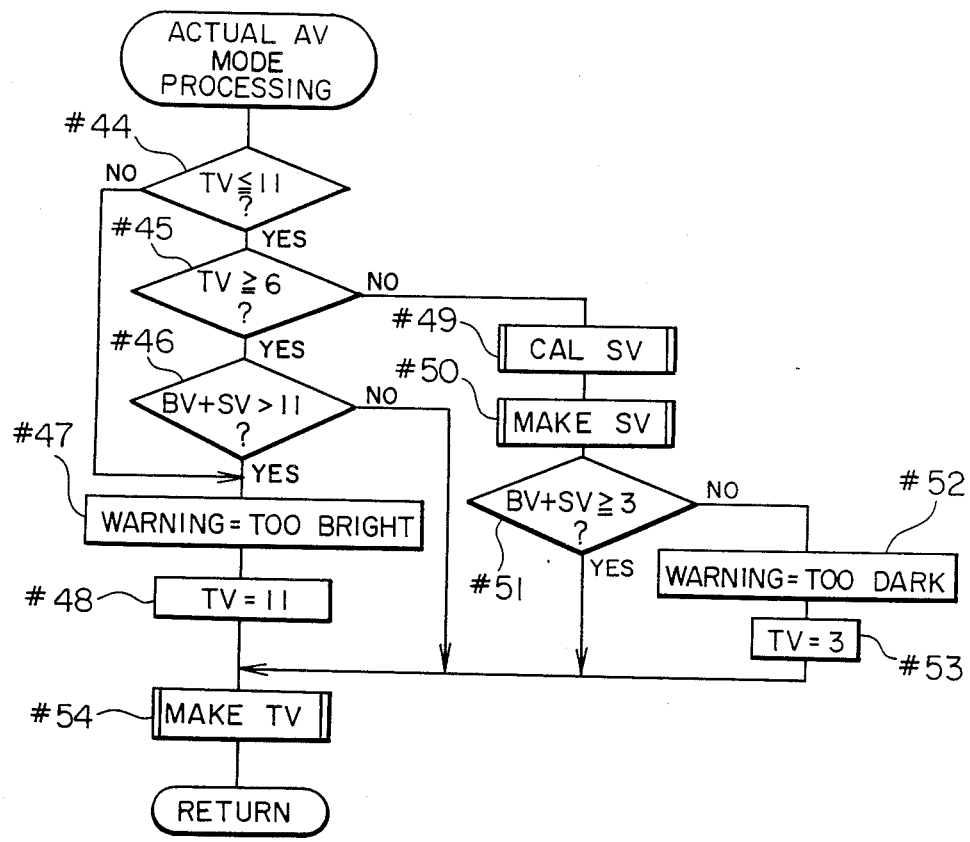

FIG. 6 is a flowchart illustrating a routine for operating the actual AV mode. In steps #44 and #45 shown in this figure, three cases for TV>11, 6≦TV≦11 and TV<6 are differentiated from each other. As a result, if TV>11, then advance to a step #47 to set "too bright" in one of the flags representing "WARNING", and change it to TV=11. If 6≦TV≦11, then advance to a step #46 to test if $BV+SV>11$. And, if $BV+SV>11$, then advance to the step #47. If $BV+SV≦11$, then skip it to a step #54.

Further, if TV<6, then advance to a step #49 in which the SV is upped in correspondence to the TV. This when to be set in a step #50 is discretely evaluated in 0.5 steps. If $BV+SV≧3$, as the luminance is relatively high, then advance to a step #54. If $BV+SV<3$, then advance to a step #52 to set "too dark" in one of the other flags representing "WARNING" with presentation of its display. After TV=3 is made, advance to a step #54.

Figure 13:
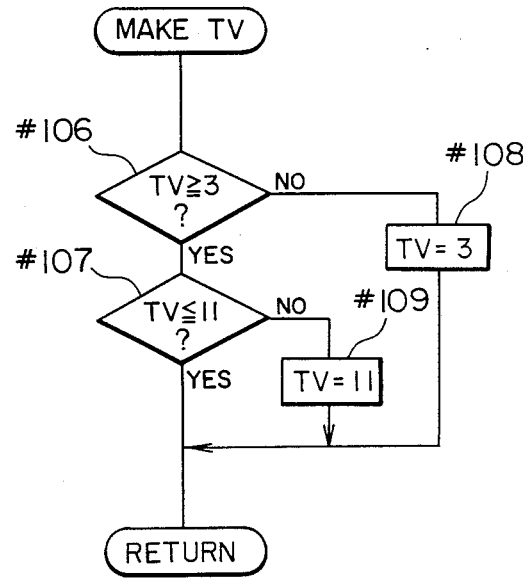

In the step #54, TV is set so as to satisfy 3≦TV≦11 as shown in FIG. 13. Then return to the main routine of FIG. 3. In such a manner, the actual AV mode is operated so that whether or not the TV is proper at the preset AV value is determined by utilizing the output of the light metering element with the diaphragm actually closed down to that AV value.

Figure 10:
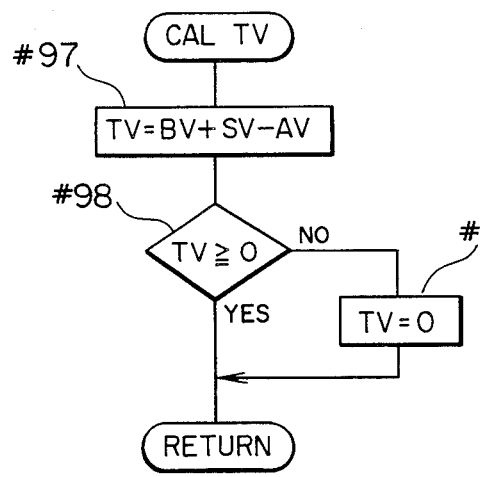

Next, if, in the step #6 of FIG. 3, the TV priority mode is determined to be in selection, then execute "CAL TV" shown in FIG. 10 in a step #10.

In this routine, TV is calculated from $TV=BV+SV-AV$. If TV<0, TV=0 is made. Then return to the main routine. If TV>0, then skip it and return to the main routine.

After that, in a step #11, "MAKE TV" shown in FIG. 13 is executed to have 3≦TV≦11. Then advance to a step #12 to perform the operation of "TV Priority Mode" by a routine shown in FIG. 7.

Figure 7:
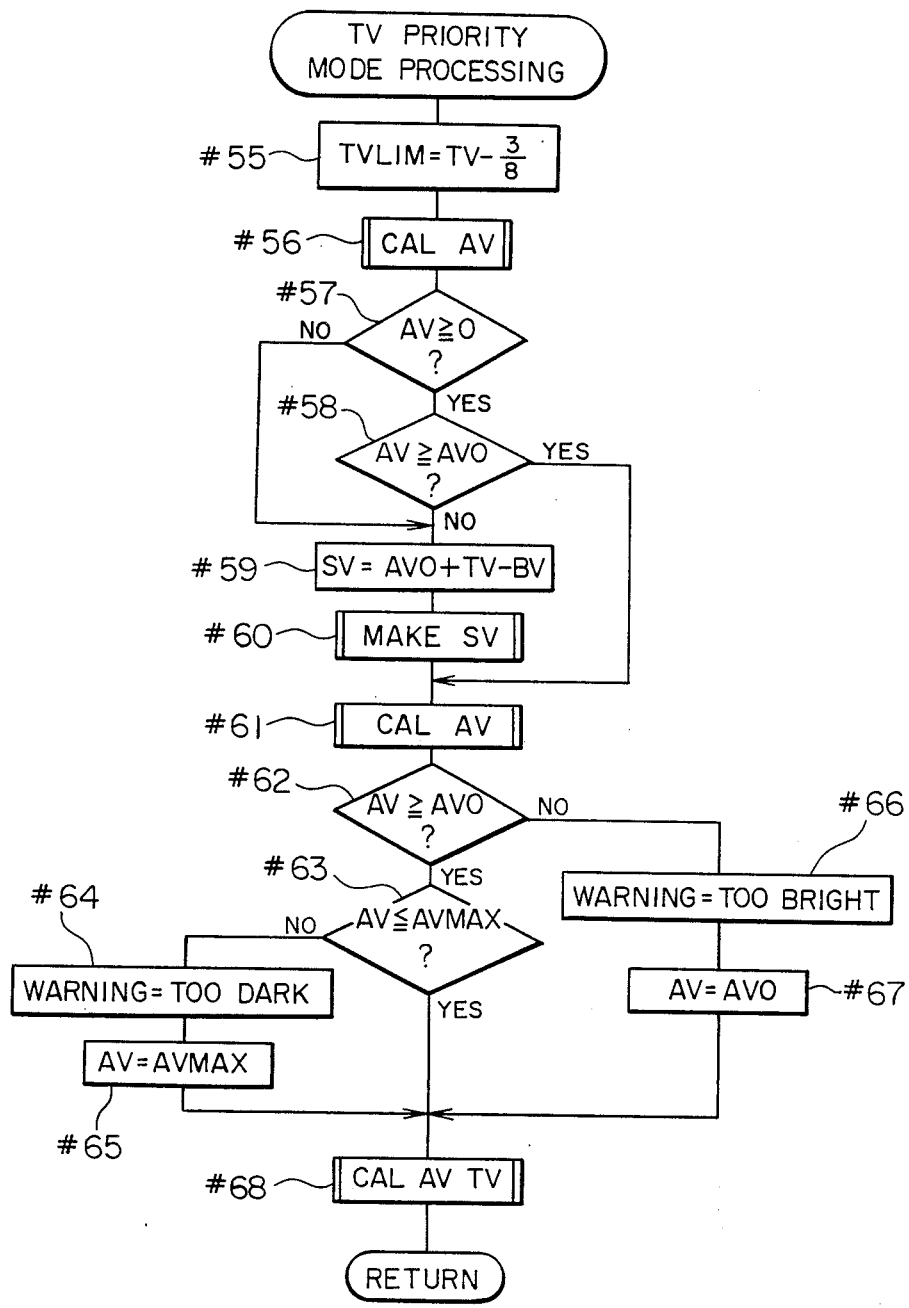
Figure 11:
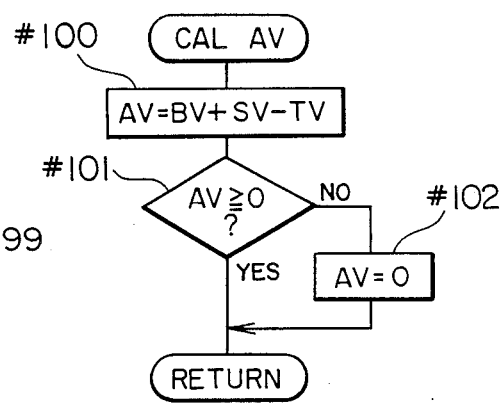

In the flow shown in FIG. 7, at first, in a step #55, $TV-(\frac{3}{8})$ is set in TVLIM. In a step #56, as shown in FIG. 11, AV is first sought from $AV=BV+SV-TV$ in a step #100. In the next step #101, whether or not $AV≧0$ is tested. If AV<0, then set AV=0. If AV≧0, then advance to a step #57 of FIG. 7.

In a step #57, whether or not AV≧0 is first tested. In a step #58, two cases for AV≧AV0 (where AV0 is the corresponding aperture value to the maximum size of aperture opening) and for AV<AV0 are then differentiated. If AV<AV0, then advance to a step #59 where using AV=AV0, SV is calculated based on the formula $SV=AV0+TV-BV$. In a step #60, "MAKE SV" of FIG. 14 is executed to make the SV discrete in 0.5 steps. After that, advance to a step #61. If AV≧AV0, then skip it and advance to the step #61.

In the step #61, AV is calculated again. This is because, for the case of AV<AV0, instead of using AV=AV0, SV is upped in 0.5 steps. So, this coarse adjustment is compensated for by correcting the AV. In a step #61, as shown in FIG. 11, AV is calculated from $AV=BV+SV-TV$. If AV<0, then change it to AV=0, or if AV>0, then skip it, before the return to the main routine.

In steps #62 and #63, three cases for AV<AV0, AV0≦AV≦AVMAX and AV>AVMAX are differentiated from each other. If AV AV0, then advance to a step #66 to set "too bright" in one of the flags representing "WARNING" with presentation of its display. After AV=AV0 is made, advance to a step #68. Also, if AV>AVMAX, then set "too dark" in one of the other flags representing "WARNING" with presentation of its display. After AV=AVMAX is made, advance to a Step #68. Further, if AV0≦AV≦AVMAX, then skip it and advance to the step #68.

Figure 9:
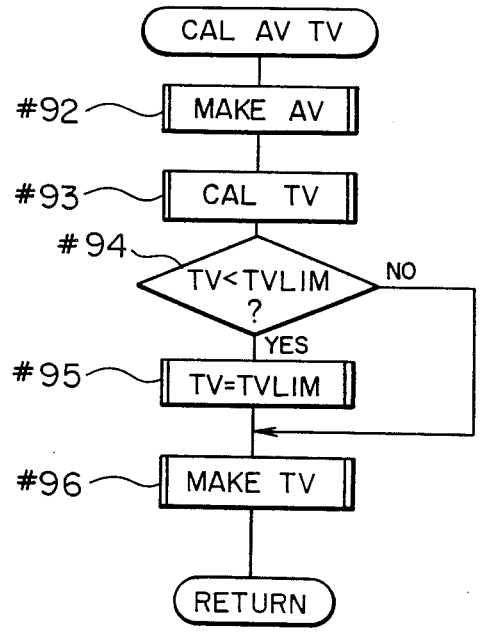

In the step #68, as shown in FIG. 9, TV is calculated on the basis of AV. Then return to the main routine shown in FIG. 3. The "CAL AV TV" that symbolizes this step #68 represents a routine shown in FIG. 9. At first, in a step #92, AV is set so as to satisfy AV0≦AV≦AVMAX. In a step #93, TV is calculated by using that AV. That is, as shown in FIG. 10, in a step #97, $TV=BV+SV-AV$ is calculated. Then, in steps #98 and #99, TV≧0 is made. In steps #94–#96, TV is set so as to satisfy max(TVLIM,3)≦TV≦11. Then return to the main routine shown in FIG. 3.

Figure 8A:
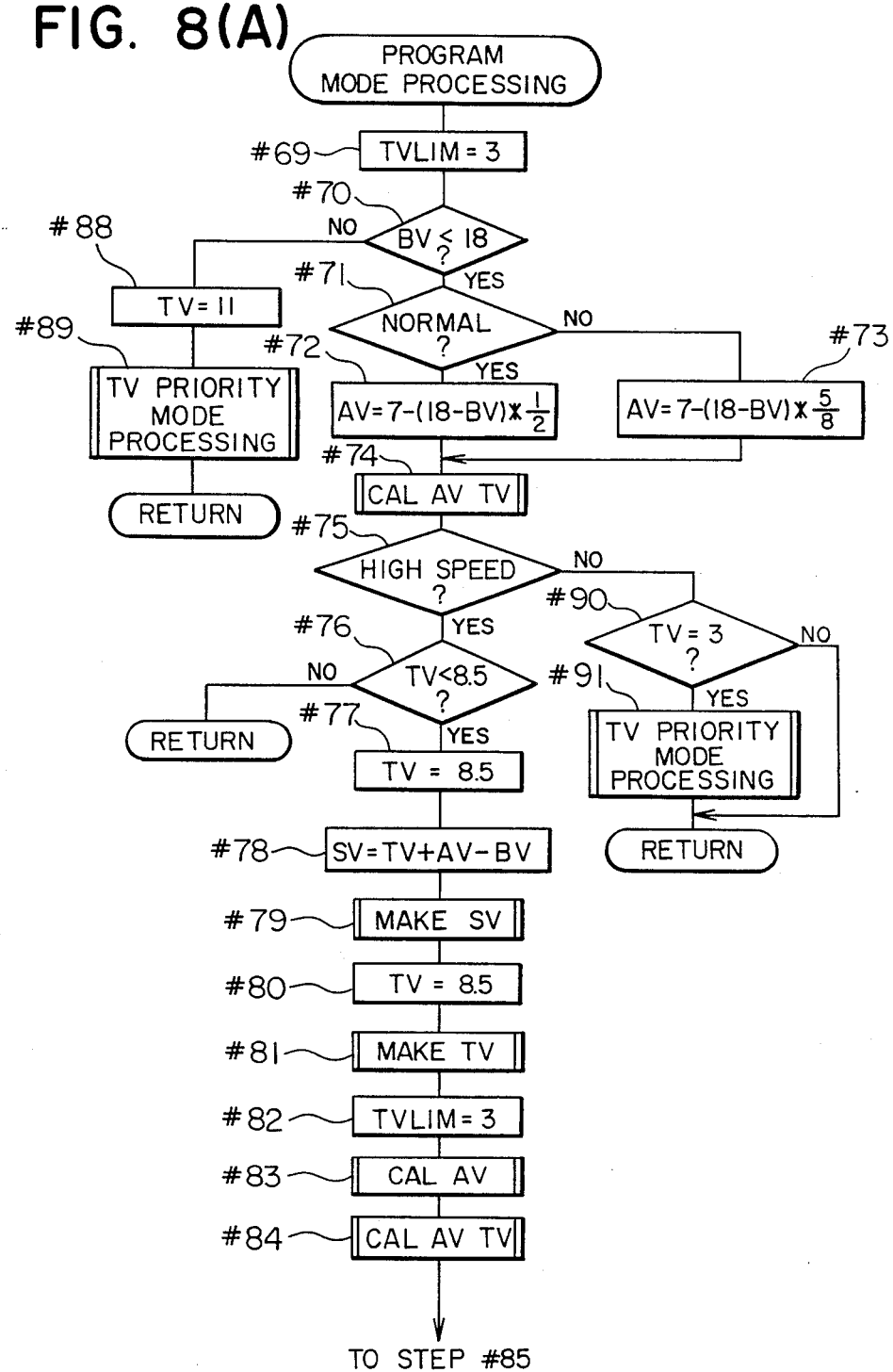
Figure 8B:
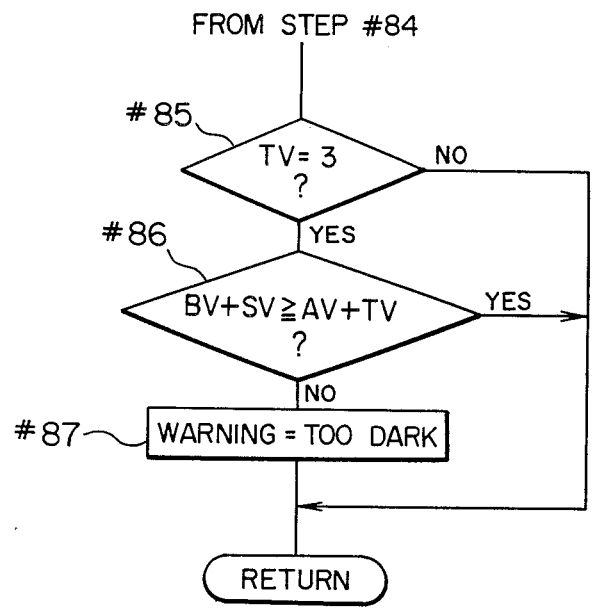

FIGS. 8(A) and 8(B) are a flowchart illustrating a routine for operating the program mode. The program mode in the embodiment of the invention can operate with selection of three ways:

(i) Normal mode;
(ii) Telephoto mode; and
(iii) High speed mode.

Of these modes, in exception of the normal mode, by contrast with the normal mode, the combination of values of the aperture (AV) and shutter time (TV) is made to alter. Particularly in the high speed mode, the rising of the gain of the image pickup system is controlled in accordance with the shutter time.

At first, in a step #69, TVLIM=3 (corresponding to $\frac{1}{8}$ sec. in shutter time) is set. Then, in a step #70, whether or not BV<18 (the luminance is very high) is tested. As a result, if BV≧18 (the luminance is very high), then advance to a step #88 to set TV=11 (shutter time: 1/2000 sec.) with which the "TV priority" mode is operated by the routine (see FIG. 7).

Also, if BV<18, then advance to a step #71 to test whether or not the above-described normal mode is set. On the basis of the result of that test, AV is calculated (in steps #72 and #73) by either one of the following equations (1) and (2): For the normal mode, $$AV = 7 - (18 - BV)*(\tfrac{1}{2}) \ldots \quad (1)$$

For the other mode, $$AV = 7 - (18 - BV)*(\tfrac{2}{3}) \ldots \quad (2)$$

In a step #74, by "CAL AV TV", AV is set so as to satisfy AV0≦AV≦AVMAX, and, further, based on this AV, TV is set so as to satisfy 3≦TV≦11.

In a step #75, whether or not the high speed mode is set is tested. If the high speed mode is not set, then advance to a step #90. And, for the case of TV=3, the routine for the "TV priority" mode of a step #91 is executed. Also, for the case of TV≠3, this routine is skipped to return to the main routine of FIG. 3.

If, in the step #75, the high speed mode is determined to be in selection, then advance to a step #76. For the case of TV≧8.5, a return to the main routine occurs without further alteration. If TV≦8.5, then advance to a step #77 to set TV=8.5.

Further, in a step #78, SV is calculated again by the equation: $SV = TV + AV - BV$.

In a step #79, the SV is set. Therefore, while the shutter time is held high, the sensitivity is so much raised, thereby it is made possible to avoid introduction of camera shake into the picture or occurrence of blurring of the object image.

In step #80-#84, AV is calculated again from the SV obtained in the step #78 with the use of TV=8.5, and TV is calculated again by using this AV. Therefore, even if there is more or less error in the alteration of the sensitivity, it is sure that a correct exposure value can be derived.

Further, in steps #85-#87 shown in FIG. 8(B), if TV=3 and $BV + SV < AV + TV$, then set "too dark" in one of the flags representing "WARNING", and return to the main routine. Otherwise, this is skipped to return to the main routine.

For note, though the foregoing embodiment has been described in connection with an example of the electronic camera which has the shutter time priority mode, program mode, full manual mode and actual aperture mode, it is of course possible to apply the invention to another type of electronic camera which has only the program mode.

Also, even to an electronic camera having a fixed relation between the values of TV and AV, needless to say, the present invention is applicable. Further, to another electronic camera having an electronic shutter (which is realized not by the mechanical shutter but by controlling the integration period of CCD or the like), too, it is possible to apply the present invention.

As has been described above, according to the present invention, depending on the nature of the photographic situation, not only the diaphragm and the shutter, but also the gain of the image pickup system is made controllable with an advantage that, for example, when in sports photography, even if the object to be photographed is dark, the user can obtain a blurring-free picture of high quality.

What is claimed is:

1. An electronic camera comprising:
   (a) detecting means for detecting the brightness of an object to be photographed;
   (b) image pickup means for receiving an optical image from the object to produce an image signal;
   (c) an exposure control member for controlling the amount of the light incident on said image pickup means within a predetermined range;
   (d) sensitivity control means for controlling variation of the amplification of said image signal of said image pickup means; and
   (e) main control means for controlling said exposure control member in accordance with the detection information of said detecting means and further controlling said sensitivity control means in said range of possible exposure control by said exposure control member.

2. A camera according to claim 1, wherein said exposure control member includes a diaphragm and a shutter.

3. A camera according to claim 1, wherein said sensitivity control means includes a gain controllable amplifier provided in said image pickup means.

4. A camera according to claim 2, wherein said diaphragm and said shutter each have minimum and maximum limit exposure values.

5. A camera according to claim 1, wherein said exposure control means includes image pickup time control means for controlling substantial image pickup time.

6. A camera according to claim 5, wherein said image pickup time control means includes a shutter.

7. A camera according to claim 1, wherein said detecting means is arranged to detect the brightness on the basis of said image signal.

8. A camera according to claim 1, wherein said exposure control means includes a diaphragm mechanism.

9. An electronic camera comprising:
   (a) image pickup means;
   (b) a diaphragm aperture;
   (c) control means for controlling said diaphragm aperture and the substantial image pickup time in accordance with brightness of an object to be photographed in a predetermined range, said control means selectively controlling the sensitivity of said image pickup means within said predetermined range of variation of the diaphragm aperture and the image pickup time.

10. A camera according to claim 9, wherein said image pickup means includes an amplifier for controlling the sensitivity of said image pickup means selectively by said control means.

11. A camera according to claim 9, wherein said control means, after having selectively controlled the sensitivity of said image pickup means, compensates the diaphragm aperture and/or the image pickup time.

12. A camera according to claim 9, further comprising display means for displaying that said sensitivity has changed.

13. An electronic camera comprising:
   (a) detecting means for detecting the brightness of an object to be photographed;
   (b) image pickup means for receiving an optical image from the object;
   (c) sensitivity control means for controlling a sensitivity of said image pickup means in accordance with the detection information of said detecting means; and
   (d) an exposure control member for controlling the amount of light incident on said image pickup means in accordance with a change of said sensitivity of said image pickup means.

14. A camera according to claim 13, wherein said exposure control member includes a diaphragm and a shutter.

15. A camera according to claim 13, wherein said sensitivity control means includes a gain controllable amplifier provided in said image pickup means.

16. A camera according to claim 13, further comprising display means for displaying that said sensitivity has changed.

* * * * *

UNITED STATES PATENT AND TRADEMARK OFFICE
CERTIFICATE OF CORRECTION

PATENT NO. : 4,884,144
DATED : November 28, 1989
INVENTOR(S) : Shingero Jinnai

It is certified that error appears in the above-identified patent and that said Letters Patent is hereby corrected as shown below:

Col. 1, lines 61,-62, change "a flow-chart" to --are a flow-chart--.

Col. 2, line 17, change "A" to --a--.

Col. 5, line 1, change "(3/8)" to --(5/8)--.

Col. 5, line 5, change "(3/8)" to --(5/8)--.

Col. 7, line 10, change "(3/8)" to --(5/8)--.

Col. 7, line 25, change " $\leq$ " to -- $<$ --.

Signed and Sealed this

Second Day of October, 1990

Attest:

HARRY F. MANBECK, JR.

*Attesting Officer*     *Commissioner of Patents and Trademarks*